United States Patent [19]
Gogna et al.

[11] Patent Number: 6,023,309
[45] Date of Patent: Feb. 8, 2000

[54] REFLECTIVE LIQUID CRYSTAL DISPLAY HAVING INTEGRAL LIGHT SHIELDING

[75] Inventors: Pawan Gogna, Yorktown Heights; Peter J. Janssen, Scarborough, both of N.Y.

[73] Assignee: Philips Electronics North America Corporation, New York, N.Y.

[21] Appl. No.: 08/995,824

[22] Filed: Dec. 22, 1997

[51] Int. Cl.[7] .......................... G02F 1/136; G02F 1/1333
[52] U.S. Cl. ............................. 349/42; 349/44; 349/111
[58] Field of Search ........................... 349/44, 38, 111, 349/110, 42

[56] References Cited

U.S. PATENT DOCUMENTS

| | | | |
|---|---|---|---|
| 5,327,268 | 7/1994 | Takabatake et al. | 359/59 |
| 5,359,441 | 10/1994 | Mori et al. | 359/51 |
| 5,365,355 | 11/1994 | Hastings et al. | 359/59 |
| 5,377,031 | 12/1994 | Vu et al. | 359/59 |
| 5,461,501 | 10/1995 | Sata et al. | 359/59 |
| 5,475,514 | 12/1995 | Salerno et al. | 359/41 |
| 5,486,485 | 1/1996 | Kim et al. | 437/41 |
| 5,682,211 | 10/1997 | Yao et al. | 349/38 |
| 5,717,224 | 2/1998 | Zhang | 257/57 |
| 5,777,701 | 7/1998 | Zhang | 349/44 |

FOREIGN PATENT DOCUMENTS

| | | |
|---|---|---|
| 0725303A1 | 8/1996 | European Pat. Off. . |
| 0763764A2 | 3/1997 | European Pat. Off. . |
| 0763766A2 | 3/1997 | European Pat. Off. . |

OTHER PUBLICATIONS

"High Resolution and Brightness LCD Projector with Reflective LCD Panels", by Sata et al., Pioneer Corporation, Japan.

*Primary Examiner*—William L. Sikes
*Assistant Examiner*—Heidi L. Eisenhut
*Attorney, Agent, or Firm*—Steven R. Biren

[57] ABSTRACT

A reflective liquid crystal display such as an AMLCD includes an array of reflective pixels located over a surface of a silicon substrate, with light transmissive regions being located between the reflective pixels. The structure includes two metal layers between the reflective pixels and the silicon substrate surface, with segments of one metal layer extending in a first direction to form row electrodes of the LCD and segments of the other metal layer extending in a second direction substantially perpendicular to the first to form column electrodes of the LCD. In order to block light that would otherwise pass through light transmissive regions between the reflective pixels, portions of the first two metal layers extend beneath the light transmissive regions between the reflective pixels. In this manner, a light-blocking function is provided without the need for a separate blocking or shading metal layer.

4 Claims, 2 Drawing Sheets

REFLECTIVE LIQUID CRYSTAL DISPLAY HAVING INTEGRAL LIGHT SHIELDING

BACKGROUND OF THE INVENTION

The invention is in the field of liquid crystal display (LCD) devices such as active matrix LCDS (AMLCDs), and relates more particularly to light shielding in such devices.

Reflective LCD devices per se are known to those of ordinary skill in this art. Such devices generally include an array of reflective pixels over a silicon substrate, with various wiring or metal layers and other elements located between the reflective pixels and a surface of the silicon substrate, and typically within an insulating layer of oxide.

A cross-section of a typical reflective LCD device is shown and described in a paper entitled "High Resolution and Brightness LCD Projector With Reflective LCD Panels" by Sato, Yagi and Hanihara of the Pioneer Corporation, Japan. A cross-section of a portion of a typical prior-art reflective LCD is shown in FIG. 3 of that paper, and a representation of that figure is shown in prior-art FIG. 1 of the instant application for convenience. With reference to the following description, familiarity with conventional features of such devices will be assumed, so that only features bearing on the present invention will be described.

Typical prior-art reflective LCD devices, such as the representative device 8 shown in FIG. 1, are typically composed, in relevant part, of a silicon substrate 10, on which are successively provided an oxide layer 12, a liquid crystal layer 14, an ITO electrode 16 and a glass layer 18. An array of pixel electrodes 20 is provided beneath the liquid crystal layer 14 in the oxide layer 12, with light transmissive regions 22 being located between the reflective pixel electrodes 20. Also provided in the oxide layer 12 and between the pixels 20 and the substrate 10 are three metal layers 24, 26 and 28. The metal layers 26 and 28 form mutually-orthogonal row and column lines, which may be connected to gate and source electrodes of MOS transistors (not shown in FIG. 1) fabricated in the underlying silicon substrate 10. In addition to these two metal layers, the third metal layer 24 is provided beneath the light transmissive regions 22 between the reflective pixels 20 to prevent light entering the device through such transmissive regions between the reflective pixels from reaching the substrate, where it might induce leakage currents on otherwise interfere with proper device operation. Note that while portions of layers 26 or 28 may incidentally block a small portion of light entering the device, the structure of FIG. 1 requires a separate metal layer to provide the required degree of light blocking. While this prior-art solution is satisfactory from a functional viewpoint, it requires an additional dedicated metal layer in the device structure, thus increasing complexity, fabrication time and cost, while decreasing reliability due to the increased complexity and greater likelihood of a short circuit.

Accordingly, it would be desirable to accomplish the light-blocking function of the dedicated metal layer in the prior art devices without the necessity for a separate metal layer provided solely for this purpose.

SUMMARY OF THE INVENTION

It is therefore an object of the invention to provide a reflective LCD device with light blocking between the reflective pixels, without providing a dedicated metal layer for this purpose. It is a further object of the invention to provide a reflective LCD device with light-blocking capability which is less complex and costly, which requires less fabrication time, and which has increased reliability as compared to prior-art devices having comparable light-blocking capability.

In accordance with the invention, these objects are achieved in a reflective LCD device of the type described above in which portions of the two metal layers from which the row and column electrodes are formed extend beneath light transmissive regions between the reflective pixels to block light passing between the reflective pixels from reaching the substrate, without the need for a separate dedicated metal layer to accomplish this function.

In a preferred embodiment of the invention, electrical components otherwise required for the reflective LCD device can also be located beneath the light transmissive regions to further block light passing between the reflective pixel regions from reaching the substrate. One example of such a component would be a capacitor fabricated from parallel polysilicon layers separated by oxide, with the polysilicon layers being located beneath the light transmissive regions between the reflective pixels, thus providing an additional light blocking element without adding to device complexity, fabrication time or cost.

Reflective LCD devices in accordance with the present invention offer a significant improvement over the prior art, with enhanced performance due to light blocking between reflective pixels without the need for additional dedicated metal layers or extra light blocking elements which would add to the complexity, fabrication time and cost of the finished device while reducing reliability.

These and other aspects of the invention will be apparent from and elucidated with reference to the embodiments described hereinafter.

BRIEF DESCRIPTION OF THE DRAWING

The invention may be more completely understood with reference to the following description, to be read in conjunction with the accompanying drawing, in which.

In the drawing, like regions are generally provided with like reference numerals in the different figures, and it should be noted that the figures are not drawn to scale.

DESCRIPTION OF THE PREFERRED EMBODIMENTS

Figure 1:
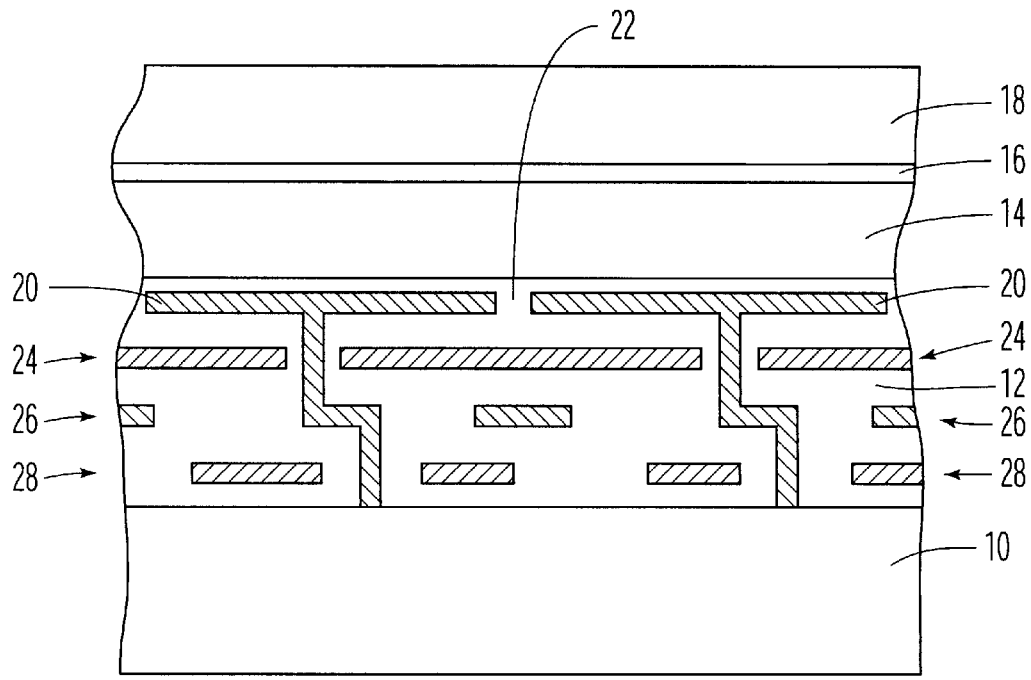
FIG. 1 shows a simplified cross-sectional view of a portion of a prior-art reflective LCD device having a separate light blocking layer.
Figure 2:
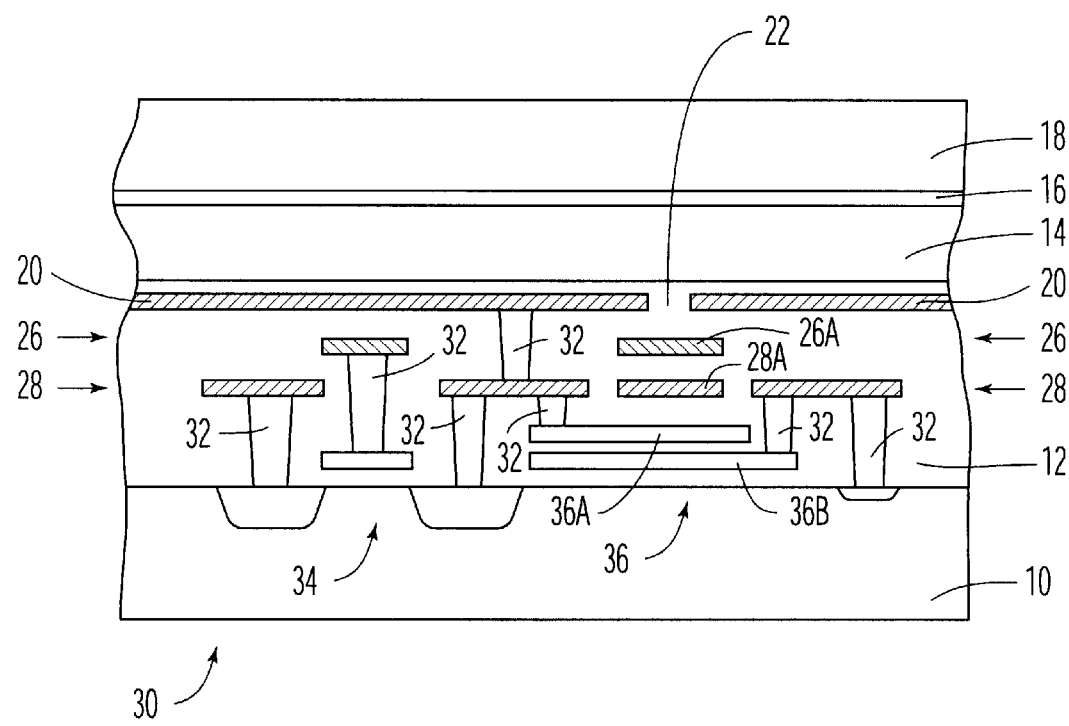
FIG. 2 shows a simplified cross-sectional view of a portion of a reflective LCD device having a light-blocking structure in accordance with the invention.

A portion of a reflective LCD device 30 in accordance with the invention is shown in a simplified cross-sectional view in FIG. 2. For clarity, only those portions of the device relating to the present invention, namely the pixel electrodes 20 and the metal layers 26 and 28 are shown hatched, with the remainder of the device being shown in simplified, outline form. A similar convention is employed for FIG. 1.

The basic structure of the device shown in FIG. 2 is similar to that of the device shown in FIG. 1, with a silicon substrate 10, on which are successively provided an oxide layer 12, a liquid crystal layer 14, an ITO electrode 16 and a glass layer 18. An array of pixel electrodes 20 is provided beneath the liquid crystal layer 14 in the oxide layer 12, with light transmissive regions 22 being located between the reflective pixel electrodes 20. In FIG. 2, only two metal layers 26 and 28 are provided in the oxide layer 12 between the pixels 20 and the substrate 10. Portions of these metal layers form mutually-orthogonal row and column lines of the device (see FIG. 3), and various segments of the metal layers 26 and 28 are connected to various elements of the device by vertically-extending metal plugs 32, of tungsten or the like. Thus, for example, the metal plugs 32 are used to connect the gate, source and drain electrodes of an MOS transistor 34 and a capacitor 36 to the metal layers 26 and 28.

In accordance with the invention, portions of the metal layers 26 and 28, for example portions 26A and 28A in FIG. 2, extend beneath the light transmissive regions 22 between the reflective pixels 20 to prevent light entering the device through such transmissive regions between the reflective pixels from reaching the substrate 10, where it might adversely affect device operation, such as by inducing leakage currents. Additional light blocking is achieved in the device shown in FIG. 2 by providing electrical components which are opaque to the transmission of light, such as the capacitor plates 36A and 36B, typically of polysilicon or the like, beneath the light transmissive regions 22 as well. It should be emphasized that both the metal layers 26 and 28, and circuit elements such as the capacitor 36, are required elements of the device independent of their light-blocking capability, so that, in accordance with the invention, this additional feature is achieved without the use of any special or additional layers or elements, such as the dedicated extra metal layer 24 of the prior-art device shown in FIG. 1.

Figure 3:
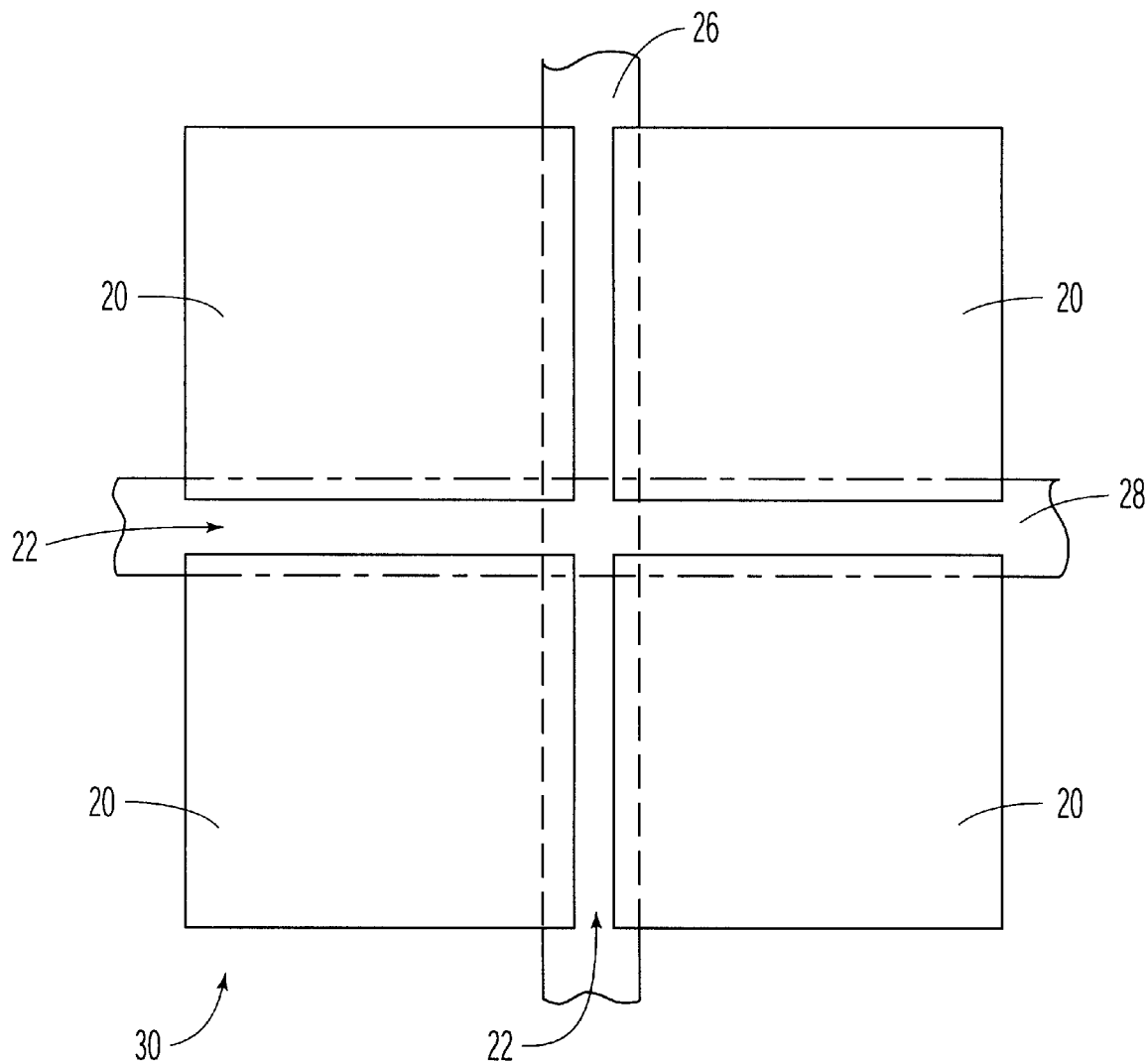
FIG. 3 shows a highly simplified plan view of a portion of a reflective LCD device having a light-blocking feature in accordance with the invention.

In order to more clearly illustrate the light-blocking function of the metal layers 26 and 28, a highly simplified plan view of a portion of the reflective LCD device 30 in accordance with the invention is shown in FIG. 3. In this figure, four rectangular (here square) pixel electrodes 20 are shown forming a portion of an array with mutually-orthogonal light transmissive regions 22 forming a grid pattern between the pixel electrodes. Portions of the first and second metal layers 26 and 28 are provided in a similar mutually-orthogonal grid pattern directly beneath the light transmissive regions 22 located between the reflective pixel electrodes 20 so that incident light passing between the reflective pixels will not reach the substrate. Since the portions of metal layers 26 and 28 shown in FIG. 3 are parts of layers that are otherwise required to provide row and column lines which interconnect various elements of the device, as shown in FIG. 2, it will be recognized that the light blocking function is accomplished without the necessity for a separate dedicated metal layer provided solely for this purpose.

In this manner, the present invention provides a reflective LCD device with a simple and effective light blocking structure which is less complex and costly, which requires less fabrication time, and which has increased reliability as compared to prior-devices having comparable light blocking capability.

While the invention has been particularly shown and described with reference to several preferred embodiments thereof, it will be understood by those skilled in the art that various changes in form and detail may be made without departing from the spirit or scope of the invention.

What is claimed is:

1. A reflective liquid crystal display (LCD) comprising an array of reflective pixels over a surface of a silicon substrate, with light transmissive regions being located between said reflective pixels, a first metal layer between said reflective pixels and said surface, segments of said first metal layer extending in a first direction to form row electrodes of said LCD, and a second metal layer between said reflective pixels and said surface, segments of said second metal layer extending in a second direction substantially perpendicular to the first to form column electrodes of said LCD, characterized in that portions of the first and second metal layers extend beneath substantially all of said light transmissive regions to substantially block all light passing between said reflective pixels from reaching said substrate without the use of a separate light-blocking metal layer, and in that at least one component of said reflective LCD is located between said array of reflective pixels and said surface and beneath a portion of said light transmissive regions to further block light passing between said reflective pixels from reaching said substrate.

2. A reflective LCD as in claim 1, wherein said component comprises a capacitor formed of layers of polysilicon.

3. A reflective LCD as in claim 1, wherein said reflective pixels are substantially rectangular, and said portions of the first and second metal layers comprising metal layers comprise metal strips at different levels and extending in mutually-perpendicular directions to form a mutually-orthogonal grid pattern.

4. A reflective LCD as in claim 1, wherein only two metal layers are provided between said reflective pixels and said surface.

* * * * *